United States Patent
Proefke et al.

(10) Patent No.: US 7,693,651 B2
(45) Date of Patent: Apr. 6, 2010

(54) METHODS AND SYSTEMS FOR MONITORING FUEL STATUS OF VEHICLES

(75) Inventors: David T. Proefke, Madison Heights, MI (US); William A. Biondo, Beverly Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/205,160

(22) Filed: Sep. 5, 2008

(65) Prior Publication Data

US 2010/0063717 A1   Mar. 11, 2010

(51) Int. Cl.
   *B60Q 1/00*   (2006.01)
(52) U.S. Cl. .......................... 701/123; 701/29; 701/30; 340/450.2
(58) Field of Classification Search .................... 701/29, 701/30, 123; 340/450.2
   See application file for complete search history.

(56) References Cited

U.S. PATENT DOCUMENTS

| | | | |
|---|---|---|---|
| 6,484,088 B1 * | 11/2002 | Reimer ....................... | 701/123 |
| 2004/0133315 A1 * | 7/2004 | Kumar et al. .............. | 700/302 |
| 2005/0149250 A1 * | 7/2005 | Isaac ......................... | 701/200 |
| 2006/0293849 A1 * | 12/2006 | Baldwin .................... | 701/213 |
| 2007/0050104 A1 * | 3/2007 | Wallace et al. ............ | 701/29 |
| 2007/0150171 A1 * | 6/2007 | Tengler et al. ............ | 701/123 |
| 2008/0234888 A1 * | 9/2008 | Zanardelli et al. ......... | 701/33 |
| 2009/0072960 A1 * | 3/2009 | Kuhnly et al. ............ | 340/450.2 |
| 2009/0157289 A1 * | 6/2009 | Graessley .................. | 701/123 |

* cited by examiner

*Primary Examiner*—Khoi Tran
*Assistant Examiner*—Brian J Broadhead
(74) *Attorney, Agent, or Firm*—Ingrassia Fisher & Lorenz, P.C.

(57) ABSTRACT

A method for monitoring fuel status of a vehicle having a fuel tank includes the steps of determining an amount of fuel in the fuel tank, obtaining a geographic location of the vehicle, calculating a fuel threshold based at least in part on the geographic location, and providing a low fuel indication if the amount of fuel is less than the fuel threshold.

17 Claims, 2 Drawing Sheets

METHODS AND SYSTEMS FOR MONITORING FUEL STATUS OF VEHICLES

TECHNICAL FIELD

The present invention generally relates to the field of vehicles and, more specifically, to methods and systems for monitoring fuel status of vehicles.

BACKGROUND OF THE INVENTION

Many vehicles today provide an indication of fuel status. In addition to the traditional fuel gauge that moves between full and empty positions, many vehicles also include a measure of fuel range (for example, an expected distance the vehicle can travel before the fuel is consumed). The measure of fuel range is often based on current consumption rates and fuel level information. When the fuel level reaches a pre-determined threshold, a low fuel indication is typically provided.

Such low fuel indications can be beneficial for drivers by, for example alerting the occupants of the vehicles to refuel their vehicles before the vehicles burn all of their fuel. However, for certain occupants and for driving in certain geographic regions, existing low fuel indications may not be optimal. For example, for individuals traveling through areas with a relatively low service station density, the vehicle may have insufficient fuel to reach a service station after the low fuel indication is provided. Even if there is sufficient fuel to reach a service station, existing low fuel indications may still leave an uncertainty as to whether the vehicle will burn all of its fuel before reaching a service station, which can cause anxiety for some vehicle occupants.

Accordingly, it is desirable to provide an improved method for monitoring fuel status in a vehicle, that allows for low fuel indications to be tailored based upon a specific geographic location of the vehicle. It is also desirable to provide an improved program product for such monitoring of fuel status in a vehicle. It is further desired to provide an improved system for such monitoring of fuel status in a vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for monitoring fuel status of a vehicle having a fuel tank is provided. The method comprises the steps of determining an amount of fuel in the fuel tank, obtaining a geographic location of the vehicle, calculating a fuel threshold based at least in part on the geographic location, and providing a low fuel indication if the amount of fuel is less than the fuel threshold.

In accordance with another exemplary embodiment of the present invention, a program product for monitoring fuel status of a vehicle having a fuel tank is provided. The program product comprises a program and a computer-readable signal-bearing media. The program is configured to at least facilitate determining an amount of fuel in the fuel tank, obtaining a geographic location of the vehicle, calculating a fuel threshold based at least in part on the geographic location, and providing a low fuel indication if the amount of fuel is less than the fuel threshold. The computer-readable signal-bearing media bears the program.

In accordance with a further exemplary embodiment of the present invention, a system for monitoring fuel status of a vehicle having a fuel tank is provided. The system comprises a sensor and a processor. The sensor is configured to at least facilitate determining an amount of fuel in the fuel tank. The processor is configured to at least facilitate obtaining a geographic location of the vehicle, calculating a fuel threshold based at least in part on the geographic location, and providing a low fuel indication if the amount of fuel is less than the fuel threshold.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
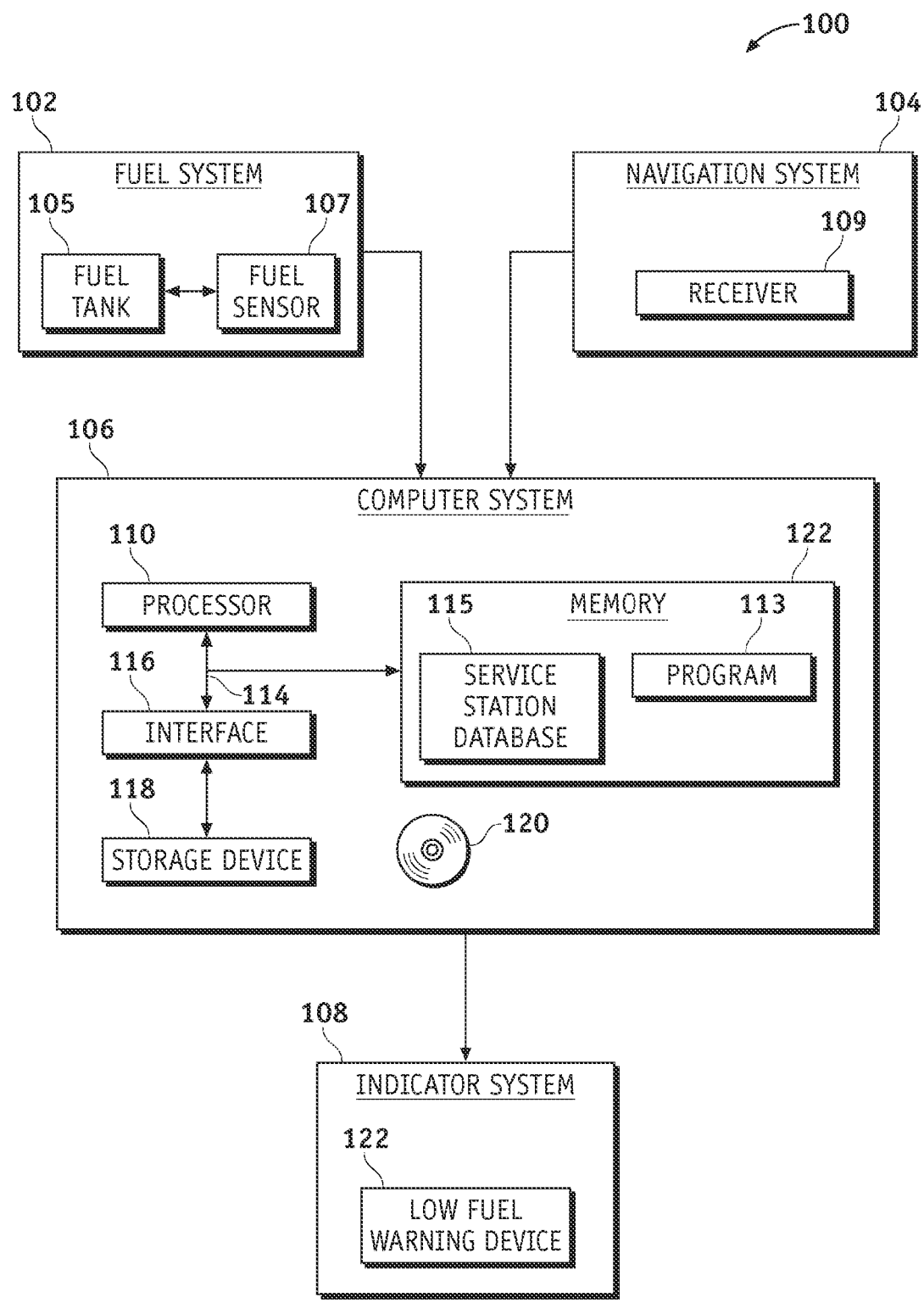
FIG. 1 is a functional block diagram of a fuel monitoring system for monitoring fuel status of a vehicle having a fuel tank, in accordance with an exemplary embodiment of the present invention.

FIG. 1 is a functional block diagram showing a fuel monitoring system 100 for monitoring fuel status of a vehicle having a fuel tank, in accordance with an exemplary embodiment of the present invention. In certain preferred embodiments, the vehicle comprises an automobile such as a sedan, a truck, a van, a sport utility vehicle, or another type of automobile. However, in various embodiments, the fuel monitoring system 100 can be used in connection with any number of types of vehicles.

As shown in FIG. 1, the fuel monitoring system 100 includes a fuel system 102, a navigation system 104, a computer system 106, and an indicator system 108. The fuel system 102 is coupled to the computer system 106, and includes a fuel tank 105 and a fuel sensor 107. The fuel tank 105 holds gasoline or other fuel for operating the vehicle. The fuel sensor 107 senses an amount of fuel remaining in the fuel tank 105 at any given time. The fuel system 102 provides information regarding the amount of fuel remaining in the fuel tank 105 (as determined by the fuel sensor 107) to the computer system 106 for processing and for selectively generating one or more low fuel indications based at least in part on this information regarding the amount of fuel remaining in the fuel tank 105. In various embodiments, the fuel system 102 of the vehicle may include multiple fuel tanks 105 and/or fuel sensors 107.

The navigation system 104 is also coupled to the computer system 106 and includes a receiver 109. The receiver 109 is configured to at least facilitate determining a geographic location of the vehicle. In a preferred embodiment, the receiver 109 determines the geographic location via satellite communications corresponding to the navigation system 104. The navigation system 104 provides information regarding the geographic location (as determined by the receiver 109) to the computer system 106 for processing and for selectively generating the one or more above-referenced low fuel indications based also at least in part on this information regarding the geographic location (and also based at least in part on the information regarding the amount of fuel remaining in the fuel tank 105, as discussed above). In various embodiments, the navigation system 104 of the vehicle may include multiple receivers 109 and/or dead-reckoning location determination via compass and speed sensors as is common in the art.

The computer system 106 is coupled between the fuel system 102, the navigation system 104, and the indicator system 108. The computer system 106 receives the information regarding the amount of fuel remaining in the fuel tank 105 from the fuel system 102 along with the information regarding the geographic location from the navigation system 104. The computer system 106 processes the information regarding the amount of fuel remaining in the fuel tank 105 and the information regarding the geographic location and provides instructions for the indicator system 108 for selectively generating low fuel indications based at least in part on this information regarding the amount of fuel remaining in the fuel tank 105 and the information regarding the geographic location. In a preferred embodiment, the computer system 106 is used to implement one or more embodiments of a process for monitoring a fuel status of the vehicle, such as a process 200 depicted in FIG. 2 and discussed further below in connection therewith.

In the embodiment depicted in FIG. 1, the computer system 106 includes a processor 110, a memory 112, a computer bus 114, an interface 116, and a storage device 118. The processor 110 performs the computation and control functions of the computer system 106 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 110 executes one or more programs 113 preferably stored within the memory 112 and, as such, controls the general operation of the computer system 106.

In a preferred embodiment, the processor 110 receives the information regarding the amount of fuel remaining in the fuel tank 105 and the information regarding the geographic location, processes both of these types of information, and provides instructions for the indicator system 108 for selectively generating low fuel indications based at least in part thereon. In so doing, the processor 110 preferably executes the one or more programs 113 stored in the memory 112.

In executing these steps, the processor 110 preferably also utilizes a service station database 115 that is also stored in the memory 112. The service station database 115 includes information regarding service stations near the geographic location, preferably including a measure of density of the service stations near the geographic location. As used herein, a service station refers to a gas station or other establishment that offers fuel for the vehicle, and any other refueling opportunity for the vehicle.

Accordingly, by utilizing the service station database 115, the processor 110 preferably provides the instructions for the indicator system 108 for selectively generating low fuel indications based at least in part on the density or a related measure of service stations near the geographic location and the amount of fuel left in the fuel tank 105. This helps the occupants of the vehicle to avoid having their vehicle burn all of its fuel during travel and to avoid or lessen anxiety regarding the amount of fuel left in the fuel tank 105.

Figure 2:
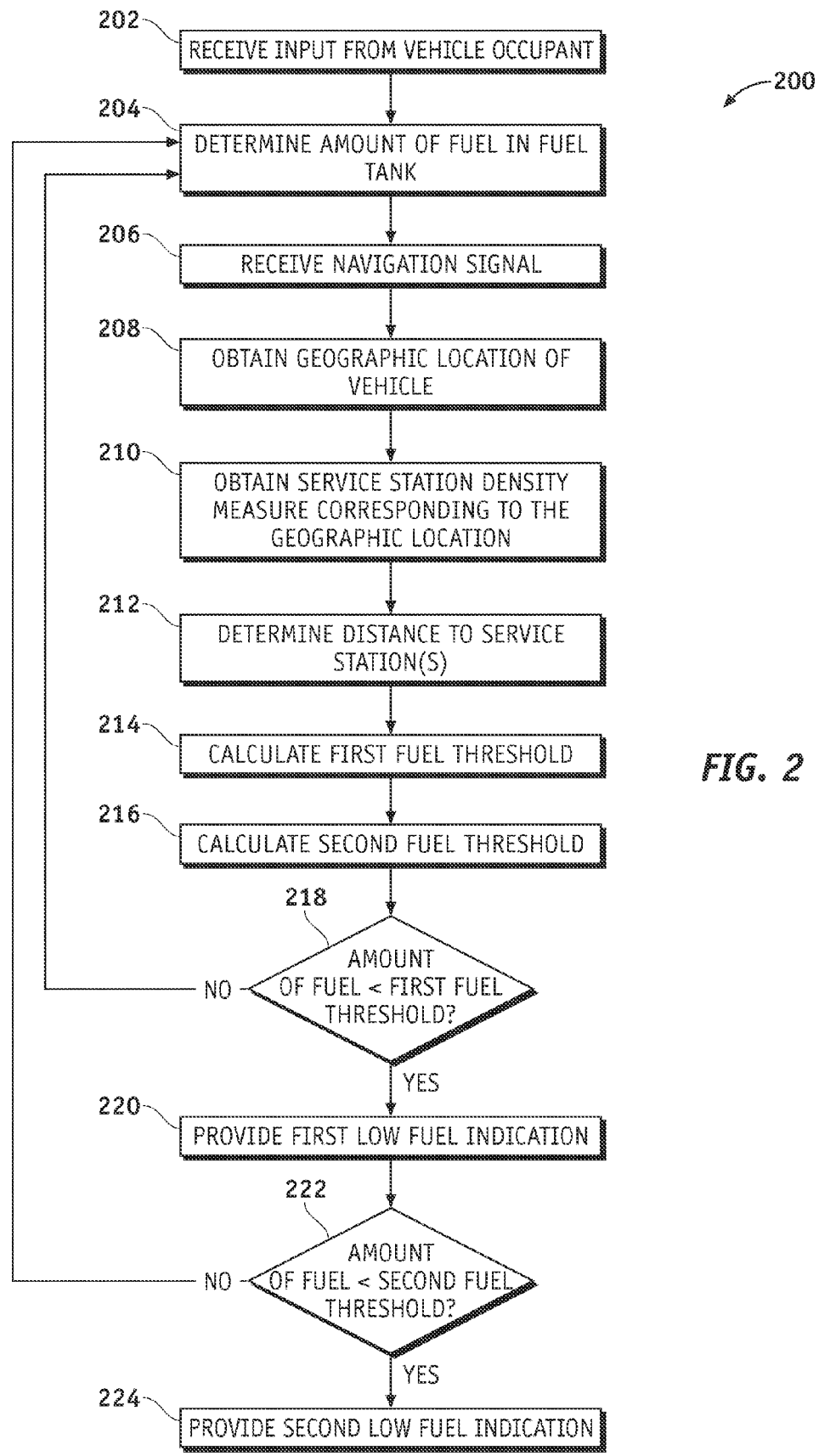
FIG. 2 is a flowchart of a process for monitoring fuel status of a vehicle having a fuel tank, and that can be implemented in connection with the fuel monitoring system of FIG. 1, in accordance with an exemplary embodiment of the present invention.

Specifically, in accordance with one exemplary embodiment of the present invention, the processor 110 obtains the geographic location from the receiver 109, obtains a service station density measure corresponding to the geographic location using the service station database 115, calculates a first fuel threshold and a second fuel threshold based at least in part on the geographic location and the service station density measure, provides instructions to the indicator system 108 for a first low fuel indication (e.g. an initial indication that the fuel in the fuel tank 105 is somewhat low) if the amount of fuel is less than the first fuel threshold but more than the second fuel threshold, if any, and provides instructions to the indicator system 108 for a second low fuel indication (e.g., a more urgent and subsequent indication/warning that the fuel in the fuel tank 105 is very low) if the amount of fuel is less than the second fuel threshold, as set forth in greater detail further below in connection with the process 200 of FIG. 2. Also as set forth in greater detail below in connection with the process 200 of FIG. 2, in certain embodiments the processor 110 also determines a distance to a service station, such as a nearest service station corresponding to the geographic location using the service station database 115 and utilizes this distance in calculating the first and/or second fuel thresholds.

As referenced above, the memory 112 stores a program or programs 113 that execute one or more embodiments of processes such as the process 200 described below in connection with FIG. 2 and/or various steps thereof and/or other processes, such as those described elsewhere herein. Also as referenced above, the memory also stores a service station database 115 for use in determining when to provide low fuel indications based upon the amount of fuel in the fuel tank 105 and the geographic location of the vehicle.

The memory 112 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 112 may be a single type of memory component, or it may be composed of many different types of memory components. In addition, the memory 112 and the processor 110 may be distributed across several different computers that collectively comprise the computer system 106. For example, a portion of the memory 112 may reside on a computer within a particular apparatus or process, and another portion may reside on a remote computer.

The computer bus 114 serves to transmit programs, data, status and other information or signals between the various components of the computer system 106. The computer bus 114 can be any suitable physical or logical means of connecting computer systems and components. This includes, but is not limited to, direct hard-wired connections, fiber optics, infrared and wireless bus technologies.

The interface 116 allows communication to the computer system 106, for example from a vehicle occupant, a system operator, and/or another computer system, and can be implemented using any suitable method and apparatus. In certain embodiments, the interface 116 receives input from an occupant of the vehicle, for example pertaining to desired thresholds for providing the low fuel indications. In addition, in certain embodiments, the interface 116 receives information regarding the amount of fuel remaining in the fuel tank 105 (for example, from the fuel system 102 or a vehicle occupant) and/or information regarding the geographic location (for example, from the navigation system 104 or a vehicle occupant) and provides such information to the processor 110, and/or provides the instructions from the processor 110 to the indicator system 108. The interface 116 can include one or more network interfaces to communicate within a vehicle occupant, the fuel system 102, the navigation system 104, the indicator system 108, and/or within or to other systems or components, one or more terminal interfaces to communicate with technicians, and one or more storage interfaces to connect to storage apparatuses such as the storage device 118.

The storage device 118 can be any suitable type of storage apparatus, including direct access storage devices such as hard disk drives, flash systems, floppy disk drives and optical disk drives. In one exemplary embodiment, the storage device 118 is a program product from which memory 112 can receive a program 113 that executes one or more embodiments of the process 200 of FIG. 2 and/or steps thereof as described in greater detail further below. In one preferred embodiment, such a program product can be implemented as part of, inserted into, or otherwise coupled to the fuel monitoring system 100. As shown in FIG. 1, the storage device 118 can comprise a disk drive device that uses disks 120 to store data. As one exemplary implementation, the computer system 106 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 120), and transmission media such as digital and analog communication links. It will similarly be appreciated that the computer system 106 may also otherwise differ from the embodiment depicted in FIG. 1, for example in that the computer system 106 may be coupled to or may otherwise utilize one or more remote computer systems and/or other control systems.

The indicator system 108 is coupled to the computer system 106, and includes a low fuel warning device 122. The low fuel warning device 122 receives the above-referenced instructions from the processor 110 for selectively generating the low fuel indications based at least in part on this information regarding the amount of fuel remaining in the fuel tank 105 and the information regarding the geographic location.

Specifically, in accordance with one exemplary embodiment of the present invention, the low fuel warning device 122 provides an initial indication that the fuel in the fuel tank 105 is below the first fuel threshold and above the second fuel threshold, if any, such as a flashing light, a verbal statement of fuel status, and/or one or more other types of audible or visual alerts that refueling is needed at some point in the future, when it receives instructions from the processor 110 to provide a first low fuel indication as described above. Similarly, in one such exemplary embodiment, the low fuel warning device 122 provides a subsequent indication/warning, such as a more intense flashing light and/or verbal statement of fuel status, and/or one or more other types of audible or visual alerts that refueling is urgently needed, when it receives instructions from the processor 110 to provide a second low fuel indication as described above.

FIG. 2 is a flowchart of a process 200 for monitoring fuel status of a vehicle having a fuel tank, in accordance with an exemplary embodiment of the present invention. In a preferred embodiment, the process 200 can be implemented in connection with the fuel monitoring system 100 of FIG. 1 and/or through program products that can be utilized in connection therewith. However, it will be appreciated that in various embodiments the process 200 may also be utilized in connection with any number of different types of systems and/or other devices.

As depicted in FIG. 2, in certain embodiments the process 200 begins with the step of receiving input from a vehicle occupant (step 202). The input may include, by way of example, a preference as to how many low fuel indications are desired by the vehicle occupant and/or what fuel thresholds are desired before the low fuel indications are provided. For example, the vehicle occupant may desire a first low fuel indication when refueling will be necessary relatively soon (e.g., when the fuel tank has sufficient fuel for the vehicle to travel to a nearest service station plus an additional distance, for example twenty miles in one exemplary embodiment), as well as a second low fuel indication when refueling is more immediately necessary (for example, when the fuel tank has sufficient fuel for the vehicle to travel to a nearest service station plus a shorter additional distance, for example five miles in one exemplary embodiment), among various other possible preferences of the vehicle occupant. In addition, in certain embodiments, the input may include an indication of the geographic location of the vehicle, for example a city, state zip code, address, or other indication of the geographic location. Preferably, the input is obtained via the interface 116 of the computer system 106 of FIG. 1.

In certain embodiments step 202 may not be required, for example if the geographic location is determined instead from the navigation system 104 of FIG. 1 and if factory standards are used instead of vehicle occupant input in determining the number of the low fuel indications to be provided and the thresholds used in connection therewith.

The method continues, in accordance with another exemplary embodiment, with a determination as to an amount of fuel in a fuel tank of the vehicle (step 204), such as the fuel tank 105 of FIG. 1. In a preferred embodiment, this determination is made at least in part by a fuel sensor, such as the fuel sensor 107 of FIG. 1. For example, such a fuel sensor may sense a volume of fuel remaining in the fuel tank, a vapor pressure in the fuel tank, or a level of fuel in the fuel tank, among other possible measures.

In addition, a navigation signal is received (step 206), preferably by the receiver 109 of FIG. 1. In a preferred embodiment, the navigation signal is received by the receiver 109 of FIG. 1 via satellite communications corresponding to the navigation system 104 of FIG. 1. Step 206 may not be required in certain embodiments, for example in which the input from the vehicle occupant from step 202 includes information as to a location of the vehicle.

A geographic location of the vehicle is obtained (step 208), preferably also by the receiver 109 of FIG. 1. In a preferred embodiment, the geographic location is obtained by the receiver 109 of FIG. 1 via the navigation signal received in step 206. In certain embodiments, the geographic location is obtained by the processor 110 of FIG. 1 based at least in part on information relating thereto provided by the receiver 109 of FIG. 1. In certain other embodiments, the geographic location is instead obtained via the input obtained from the vehicle occupant in step 202.

In addition, a service station density measure is obtained (step 210). The service station density measure preferably includes information pertaining to a density of service stations in proximity to the geographic location obtained in step 208. In a preferred embodiment, the service station density measure is obtained by the processor 110 of FIG. 1 from the service station database 115 stored in the memory 112 of the computer system 106 of FIG. 1. In certain other embodiments, the service station density measure may be obtained via other means, for example by a signal received by the receiver 109 of FIG. 1.

In addition, in certain embodiments, a distance is calculated to one or more nearby service stations (step 212). The distance is preferably calculated by the processor 110 of FIG. 1 based on the geographic location obtained in step 208. For example, in one exemplary embodiment, the distance is calculated as a distance to a nearest service station from the current geographic location of the vehicle, preferably along a path in which the vehicle is moving. In one preferred embodiment, the distance is calculated with respect to a nearest service station or multiple nearest service stations in a direction of travel or along a planned navigation route for the vehicle. In other exemplary embodiments, the distance is calculated with respect to a second such nearest service station or service stations, a third such nearest service station or service stations, a fourth such nearest service station or service stations, a fifth such nearest service station, or another service station, or combinations thereof. The number of service stations used for the one or more calculated distances may vary in other embodiments, as may the criteria for such service stations. For example, in certain other embodiments, service stations may also be utilized to calculate one or more such distances even if such service stations are not in the direction of travel or along the planned navigational route of the vehicle. In addition, in certain additional embodiments, the distance is calculated as an average distance to various service stations in an area corresponding generally to the geographic location (for example, an average distance to service stations within a county or a stretch of the closest highway corresponding to the geographic location, or using any number of other different criteria). However, as mentioned above, in various other techniques, other criteria may be used.

In certain embodiments, step 212 may not be necessary. For example, in certain embodiments, the service station density measure obtained in step 210 may be used exclusively along with the geographic location obtained in step 208 in determining the fuel thresholds described below for providing the low fuel indications.

A first fuel threshold is then calculated (step 214). The first fuel threshold represents a threshold amount of fuel in a fuel tank of the vehicle, such as the fuel tank 105 of FIG. 1, such that a first low fuel indication is provided if the fuel in the fuel tank is less than the first fuel threshold. The first fuel threshold is preferably calculated based upon the service station density measure obtained in step 210. Preferably, the first fuel threshold (as well as the second fuel threshold, if any, described below, and any additional fuel thresholds) are inversely related to the service station density measures, such that the low fuel indications will be provided sooner when the vehicle is in a geographic location with a lower density of service stations nearby. In one embodiment, a table or formula for calculating the fuel thresholds based on the service station density measures and/or other values is stored in the memory 112 of FIG. 1.

In certain embodiments, the first fuel threshold is calculated based upon the distance calculated in step 212, and/or one or more related distances. For example, in one exemplary embodiment, the first fuel threshold represents an amount of fuel in the fuel tank that would typically allow the vehicle to reach various different service stations near the geographic location even if the vehicle occupant were to first complete his or her trip and/or execute a few errands before seeking the nearest service station. For example, in one such embodiment, the first threshold is approximately equal to a multiple of the distance calculated in step 212, such as two or three times the distance calculated in step 212.

In certain embodiments, a second fuel threshold is also calculated (step 216). The second fuel threshold represents a threshold amount of fuel in a fuel tank of the vehicle, such as the fuel tank 105 of FIG. 1, such that a second low fuel indication is provided if the fuel in the fuel tank is less than the second fuel threshold. Similar to the first fuel threshold, the second fuel threshold is preferably calculated based upon the service station density measure obtained in step 210. In certain embodiments, the second fuel threshold is also calculated based upon the distance calculated in step 212. For example, in one exemplary embodiment, the second fuel threshold comprises a limited amount of fuel in the fuel tank such that the vehicle occupant is advised to immediately visit the nearest service station. For example, in one such embodiment, the second fuel threshold is approximately equal to the distance calculated in step 212.

In certain embodiments step 216 may not be required, for example if only a single low fuel indication is desired. In certain other embodiments, more than two fuel thresholds are calculated, preferably corresponding to additional low fuel indications.

A determination is made as to whether the amount of fuel in the fuel tank is less than the first fuel threshold (step 218). In a preferred embodiment, this determination is made by the processor 110 of FIG. 1. If it is determined that the amount of fuel in the fuel tank is less than the first fuel threshold, then a first low fuel indication is provided (step 220). Otherwise, the process proceeds instead to step 204, and steps 204-218 repeat until a determination is made in a subsequent iteration of step 218 that the amount of fuel in the fuel tank is less than the first fuel threshold.

In certain embodiments in which a second low fuel indication is also desired, another determination is made as to whether the amount of fuel in the fuel tank is less than the second fuel threshold (step 222). In a preferred embodiment, this determination is also made by the processor 110 of FIG. 1. If it is determined that the amount of fuel in the fuel tank is less than the second fuel threshold, then a second low fuel indication is provided (step 224). Otherwise, the process proceeds instead to step 204, and steps 204-222 repeat until a determination is made in a subsequent iteration of step 222 that the amount of fuel in the fuel tank is less than the second fuel threshold.

In a preferred embodiment, during such iterations of steps 204-222, the first low fuel indication is continually provided in subsequent iterations of step 220 each time that there is an indication in an iteration of step 218 that the amount of fuel in the fuel tank is less than the first fuel threshold. However, this may vary in certain embodiments, for example if it is desired that the first low fuel indication be a momentary indication. In addition, as noted above, in certain embodiments only one low fuel indication may be desired (in which steps 216, 222, and 224 would be unnecessary), while in other embodiments more than two low fuel indications may be provided based on more than two fuel thresholds similar to steps 214-224 discussed above.

Also in a preferred embodiment, the first and second low fuel indications are provided by the low fuel warning device 122 of the indicator system 108 of FIG. 1, based upon instructions provided thereto by the processor 110 of the computer system 106 of FIG. 1. These instructions preferably are in turn based upon the determinations made in steps 218 and 222 as to whether the amount of fuel in the fuel tank is less than the first fuel threshold and the second fuel threshold, respectively. In addition, in one exemplary embodiment, the first low fuel indication comprises a flashing light, a verbal statement of fuel status, and/or one or more other types of audible or visual alerts that refueling is needed at some point in the future, while the second low fuel indication comprises a more intense flashing light and/or verbal statement of fuel status and/or one or more other types of audible or visual alerts that refueling is urgently needed.

As alluded to above, it will be appreciated that certain steps of the process 200 may be unnecessary and/or may vary from those depicted in FIG. 2 and described above. It will similarly be appreciated that various steps of the process 200 may occur simultaneously or in an order that is otherwise different from that depicted in FIG. 2 and/or described above.

Accordingly, improved methods, program products, and systems are provided for monitoring fuel status in a vehicle. The improved methods, program products, and systems allow occupants to receive low fuel indications at optimal times based on the occupant's geographic locations and a proximity to nearby service stations. The improved methods, program products, and systems thereby decrease the likelihood that the vehicle will burn all of its fuel in a geographic location with a low density of service stations, and also help to reduce anxiety of the vehicle occupants associated with a fuel tank that may be low in fuel.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for monitoring fuel status of a vehicle having a fuel tank, the method comprising the steps of:
   determining an amount of fuel in the fuel tank;
   obtaining a geographic location of the vehicle;
   obtaining a service station density measure corresponding to the geographic location;
   calculating a fuel threshold based at least in part on the service station density measure corresponding to the geographic location; and
   providing a low fuel indication if the amount of fuel is less than the fuel threshold.

2. The method of claim 1, further comprising the steps of:
   determining a distance to a service station corresponding to the geographic location,
   wherein the step of calculating the fuel threshold comprises the step of calculating the fuel threshold based also at least in part on the distance to the service station.

3. The method of claim 1, wherein the step of providing the low fuel indication comprises the step of providing a visual alert.

4. The method of claim 1, wherein the step of providing the low fuel indication comprises the step of providing an audio alert.

5. The method of claim 1, further comprising the step of:
   receiving input from an occupant of the vehicle,
   wherein the step of calculating the fuel threshold comprises the step of calculating the fuel threshold based also on the input.

6. The method of claim 1, further comprising the steps of:
   calculating a second fuel threshold based at least in part on the geographic location; and
   providing a second low fuel indication if the amount of fuel is less than the second fuel threshold.

7. A computer system for monitoring fuel status of a vehicle having a fuel tank, the computer system comprising:
   (a) a memory storing a program configured to at least facilitate:
   determining an amount of fuel in the fuel tank;
   obtaining a geographic location of the vehicle;
   obtaining a service station density measure corresponding to the geographic location;
   calculating a fuel threshold based at least in part on the service station density measure corresponding to the geographic location; and
   providing a low fuel indication if the amount of fuel is less than the fuel threshold; and
   (b) a processor coupled to execute the program.

8. The computer system of claim 7, wherein the program is further configured to at least facilitate:
   determining a distance to a service station corresponding to the geographic location; and
   calculating the fuel threshold based also at least in part on the distance to the service station.

9. The computer system of claim 7, wherein the program is further configured to at least facilitate providing a visual alert if the amount of fuel is less than the fuel threshold.

10. The computer system of claim 7, wherein the program is further configured to at least facilitate providing an audio alert if the amount of fuel is less than the fuel threshold.

11. The computer system of claim 7, wherein the program is further configured to at least facilitate:
    receiving input from an occupant of the vehicle; and
    calculating the fuel threshold based also at least in part on the input.

12. The computer system of claim 7, wherein the program is further configured to at least facilitate:
    calculating a second fuel threshold based at least in part on the geographic location; and
    providing a second low fuel indication if the amount of fuel is less than the second fuel threshold.

13. A system for monitoring fuel status of a vehicle having a fuel tank, the system comprising:
    a sensor configured to at least facilitate determining an amount of fuel in the fuel tank; and
    a processor configured to at least facilitate:
        obtaining a geographic location of the vehicle;
        obtaining a service station density measure corresponding to the geographic location;
        calculating a fuel threshold based at least in part on the service station density measure corresponding to the geographic location; and
        providing a low fuel indication if the amount of fuel is less than the fuel threshold.

14. The system of claim 13, wherein the processor is further configured to at least facilitate:
    determining a distance to a service station corresponding to the geographic location; and calculating the fuel threshold based also at least in part on the distance to the service station.

15. The system of claim 13, further comprising:

a receiver configured to at least facilitate determining the geographic location via satellite communications, wherein the processor is configured to obtain the geographic location from the receiver.

16. The system of claim 13, further comprising:

an interface configured to at least facilitate receiving input from an occupant of the vehicle, wherein the processor is configured to at least facilitate calculating the fuel threshold based also at least in part on the input.

17. The system of claim 13, wherein the processor is further configured to at least facilitate:

calculating a second fuel threshold based at least in part on the geographic location; and providing a second low fuel indication if the amount of fuel is less than the second fuel threshold.

\* \* \* \* \*